United States Patent
Ellsworth et al.

(10) Patent No.: US 11,788,471 B2
(45) Date of Patent: Oct. 17, 2023

(54) SYSTEMS AND METHODS FOR PREVENTING FUEL LEAKAGE IN A GAS TURBINE ENGINE

(71) Applicant: General Electric Company, Schenectady, NY (US)

(72) Inventors: Richard Allen Ellsworth, Cincinnati, OH (US); Frederick Ehrwulf van Alen, Cincinnati, OH (US); Thomas Vander Ng, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/577,674

(22) Filed: Jan. 18, 2022

(65) Prior Publication Data

US 2022/0136442 A1 May 5, 2022

Related U.S. Application Data

(63) Continuation of application No. 16/594,280, filed on Oct. 7, 2019, now Pat. No. 11,242,801, which is a continuation of application No. 14/396,459, filed as application No. PCT/US2013/038393 on Apr. 26, 2013, now Pat. No. 10,473,031.

(60) Provisional application No. 61/639,627, filed on Apr. 27, 2012.

(51) Int. Cl.
*F02C 7/232* (2006.01)
*F02C 7/22* (2006.01)

(52) U.S. Cl.
CPC .............. *F02C 7/232* (2013.01); *F02C 7/222* (2013.01); *F05D 2260/602* (2013.01)

(58) Field of Classification Search
CPC .......... F02C 7/222; F02C 7/232; Y02T 50/60; F05D 2260/602
See application file for complete search history.

(56) References Cited

U.S. PATENT DOCUMENTS

| | | | |
|---|---|---|---|
| 4,612,766 A | 9/1986 | Eder | |
| 5,528,897 A | 6/1996 | Halin | |
| 5,809,771 A | 9/1998 | Wernberg | |
| 6,195,978 B1 | 3/2001 | Futa, Jr. | |
| 6,619,025 B2 | 9/2003 | Wernberg | |
| 6,751,939 B2 | 6/2004 | Futa, Jr. et al. | |
| 7,131,274 B2 | 11/2006 | Baryshnikov et al. | |
| 7,854,121 B2 | 12/2010 | Vandale et al. | |
| 2003/0200754 A1 | 10/2003 | Futa, Jr. et al. | |
| 2005/0011197 A1 | 1/2005 | Tuttle et al. | |
| 2010/0132368 A1 | 6/2010 | Lawrence | |

FOREIGN PATENT DOCUMENTS

| | | |
|---|---|---|
| CN | 101008497 A | 8/2007 |
| JP | 60169000 A | 9/1985 |
| JP | 2005530951 A | 10/2005 |

*Primary Examiner* — Gerald L Sung
*Assistant Examiner* — Rene D Ford
(74) *Attorney, Agent, or Firm* — Dority & Manning, P.A.

(57) ABSTRACT

Systems and methods for preventing fuel leakage in a gas turbine engine are provided. A fuel accumulation system includes a control valve section fluidly coupled to a fuel manifold passage and an accumulator valve section fluidly coupled at a first side to the control valve section. The control valve section is configured to control expansion of a fluid flowing in the fuel manifold passage. The accumulator valve section is configured to receive fluid expanded in the fuel manifold passage via the control valve section.

17 Claims, 4 Drawing Sheets

SYSTEMS AND METHODS FOR PREVENTING FUEL LEAKAGE IN A GAS TURBINE ENGINE

PRIORITY INFORMATION

This application claims priority to U.S. Non-Provisional application Ser. No. 16/594,280 having a filing date of Oct. 7, 2019, which is a Continuation of U.S. Non-Provisional application Ser. No. 14/396,459 filed Oct. 23, 2014, which is a national phase application of PCT/US2013/038393 filed Apr. 26, 2013, which claims priority to U.S. Provisional Application No. 61/639,627 filed Apr. 27, 2012, which are hereby incorporated by reference in their entirety.

BACKGROUND

The field of the invention relates generally to fuel leakage prevention, and more particularly to a method and a fuel accumulator system for preventing fuel leakage in a gas turbine engine.

Aircraft turbofan engines produce a high amount of heat in order to meet a stringent requirement on fuel efficiency and pollutants. During shutdown of these engines, the engine heat flows to cooler sections of the engine, which may be referred to as soakback. Soakback can cause the fuel manifold, which is cooler than other parts of the engine, to increase in temperature. The fuel manifold is a closed system at engine shutdown, so as the temperature rises, fuel pressure increases because of bulk fuel expansion. If the pressure rises above the cracking pressure of the fuel nozzles, then the fuel will leak into the hot engine, causing fuel vapors to leak out of both the inlet and the exhaust of the engine. The vapors can affect aircraft certification and customer acceptance, as well as increase the costs associated with operating the engine.

Designing a ventilation system to enable the heat to escape typically requires long lead times and difficult integration with the engine, both of which increase costs of implementing ventilation systems. Accordingly, a system is needed for these engines that prevents pressure build-up in the fuel manifold, thereby preventing fuel from leaking into the engine.

BRIEF DESCRIPTION

In one aspect, a fuel accumulation system for a gas turbine engine is provided. The fuel accumulation system includes a control valve section fluidly coupled to a fuel manifold passage and an accumulator valve section fluidly coupled at a first side to the control valve section. The control valve section is configured to control expansion of a fluid flowing in the fuel manifold passage. The accumulator valve section is configured to receive fluid expanded in the fuel manifold passage via the control valve section.

In another aspect, a method of preventing fuel leakage in a gas turbine engine is provided. The method includes controlling expansion of a fluid flowing in a fuel manifold passage using a control valve section fluidly coupled to the fuel manifold passage and receiving fluid expanded in the fuel manifold passage via the control valve section at an accumulator valve section fluidly coupled to the control valve section.

In yet another aspect, a gas turbine engine is provided that includes a fuel split valve and a fuel accumulation system coupled to the fuel split valve. The fuel accumulation system includes a control valve section fluidly coupled to a fuel manifold passage and an accumulator valve section fluidly coupled at a first side to the control valve section. The control valve section is configured to control expansion of a fluid flowing in the fuel manifold passage. The accumulator valve section is configured to receive fluid expanded in the fuel manifold passage via the control valve section.

DETAILED DESCRIPTION

The following detailed description illustrates an accumulator system and a method of assembling the same by way of example and not by way of limitation. The description enables one of ordinary skill in the art to make and use the disclosure, and the description describes several embodiments of the disclosure, including what is presently believed to be the best mode of carrying out the disclosure. The disclosure is described herein as being applied to a preferred embodiment, namely, an accumulator and a method of assembling the same. However, it is contemplated that this disclosure has general application to accumulators in a broad range of systems and in a variety of industrial and/or consumer applications.

Figure 1:
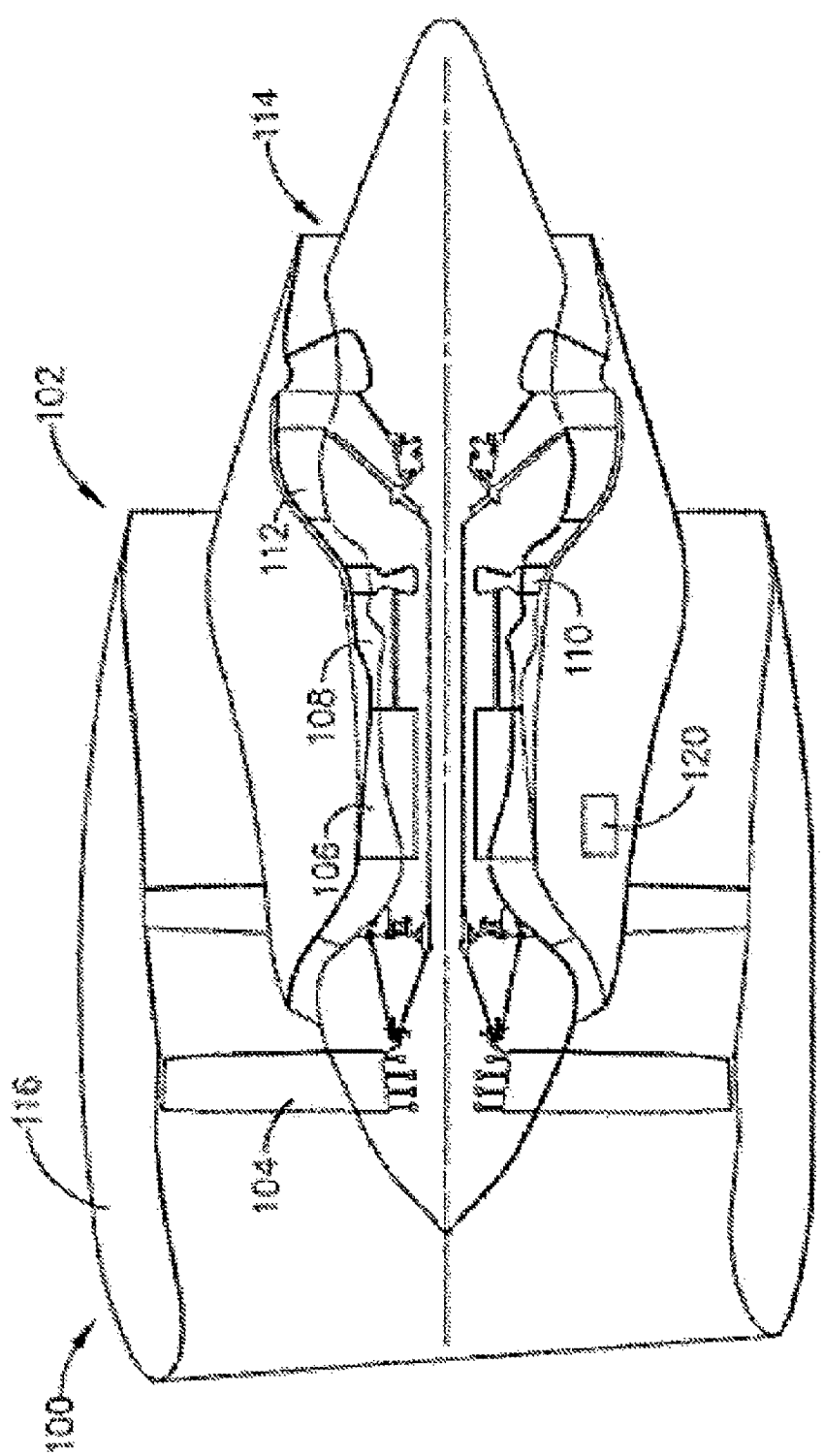
FIG. 1 is a schematic view of an exemplary core engine assembly for use in propelling an aircraft.

FIG. 1 is a schematic view of an exemplary gas turbine engine (GTE) assembly 100 for use in propelling an aircraft. GTE assembly 100 includes a core engine 102 that includes a high pressure compressor 106, a combustor 108, and a high pressure turbine 110. GTE assembly 100 also includes a fan assembly 104 and a low pressure turbine 112. In operation, air flows through fan assembly 104 and compressed air is supplied from fan assembly 104 to high pressure compressor 106. The highly compressed air is delivered to combustor 108. Exhaust from combustor 108 drives rotating turbines 110 and 112 and exits GTE assembly 100 through an exhaust system 114.

GTE assembly 100 further includes a generally annular nacelle 116 that surrounds fan assembly 104 and is radially spaced outwardly from core engine 102. In the exemplary embodiment, a fuel accumulator system 120 is coupled to core engine 102 within nacelle 116 to allow for fuel vapor expansion without leakage of the fuel remaining within core engine 102 upon engine shutdown. In an alternative embodiment, accumulator system 120 may be coupled anywhere within nacelle 116 that allows it to function as described herein.

Figure 2:
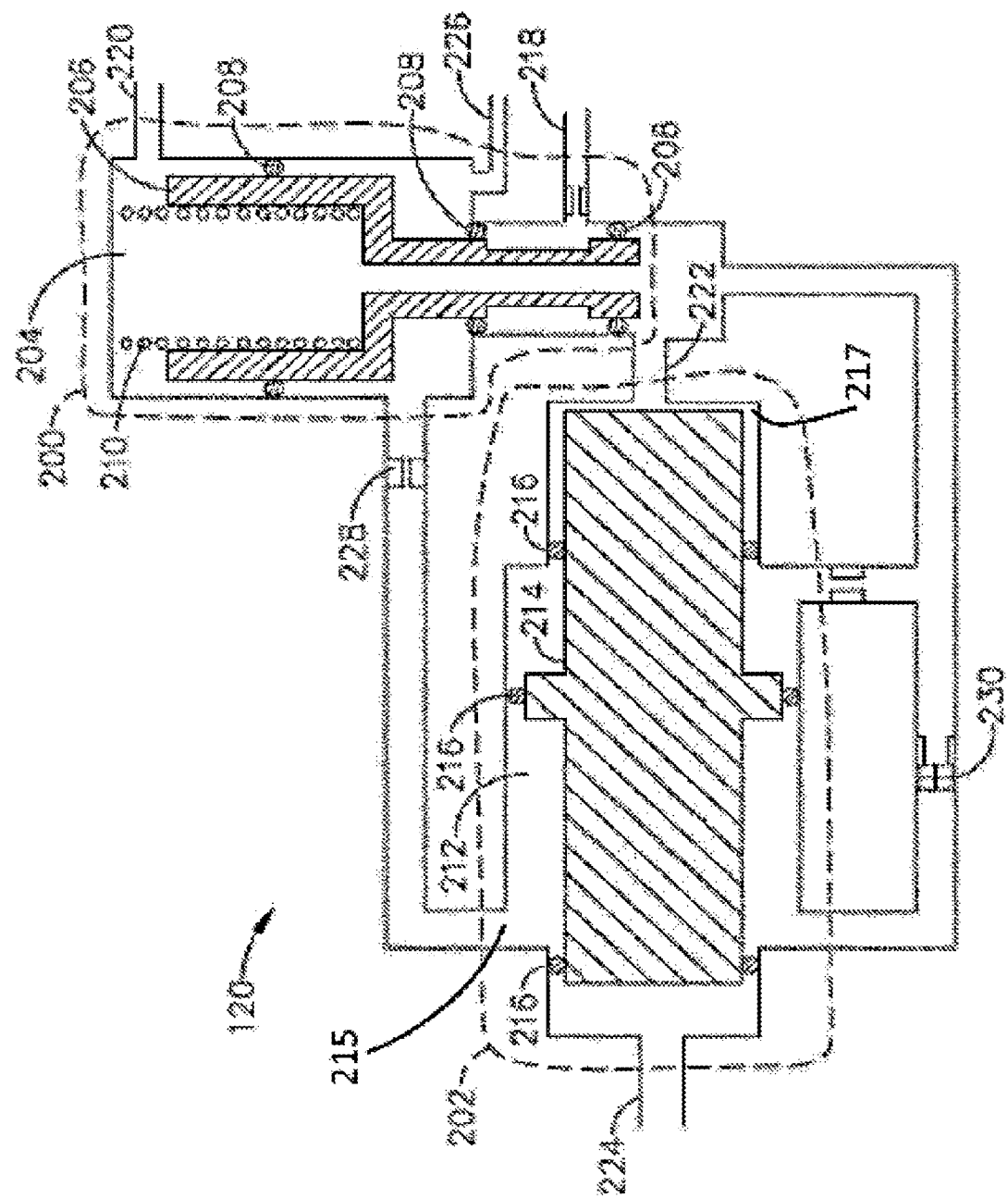
FIG. 2 is a schematic view of an exemplary accumulator system used in a gas turbine engine as shown in FIG. 1 at the start of engine shutdown.

FIG. 2 is a schematic view of accumulator system 120 as shown in FIG. 1 at a start of engine shutdown. Accumulator system 120 includes a control valve section 200 and an accumulator section 202. Control valve section 200 defines a control valve chamber 204 and includes a control valve 206 that is slideably coupled within control valve chamber 204 by one or more o-ring seals 208 and springs 210. Accumulator section 202 defines an accumulator chamber 212 and includes an accumulator piston 214. Accumulator piston 214 includes a high pressure side 215 fluidly coupled downstream from a high pressure passage 226 (discussed below), and a low pressure side 217 fluidly coupled downstream from a low pressure drain passage (discussed below). Accumulator piston 214 is slideably coupled within accumulator chamber 212 by one or more o-ring seals 216.

Control valve section 200 is fluidly coupled to the engine's fuel system (not shown) by a fuel manifold passage 218 and a drain passage 220. Control valve section 200 is fluidly coupled to accumulator section 202 by an accumulator passage 222. When control valve 206 is in the closed position (shown in FIG. 2), fuel manifold passage 218 is closed off from accumulator passage 222. Control valve 206 is closed when fuel pressure entering high pressure passage 226 is greater than the force exerted in an opposite direction by spring 210 and low pressure drain passage 220. Spring 210 is forced into a retracted position while control valve 206 is closed. Alternatively, when control valve 206 is in a second, or open, position (shown in FIG. 3), the force from spring 210 and pressure at drain passage 220 overcomes pressure from high pressure passage 226, opening access to accumulator passage 222 by fuel manifold passage 218.

Accumulator section 202 is fluidly coupled to accumulator passage 222 and ambient air passage 224. Accumulator piston 214 may be in a first, or closed, position (shown in FIG. 2), which closes accumulator chamber 212 off from control valve chamber 204 when the pressure entering accumulator chamber 212 from ambient air passage 224 is greater than the pressure entering accumulator passage 222. Piston 214 may be in a second, or open, position (shown in FIG. 3), opening access between accumulator chamber 212 and control valve chamber 204 when the pressure from accumulator passage 222 overcomes the pressure from ambient air passage 224.

Figure 3:
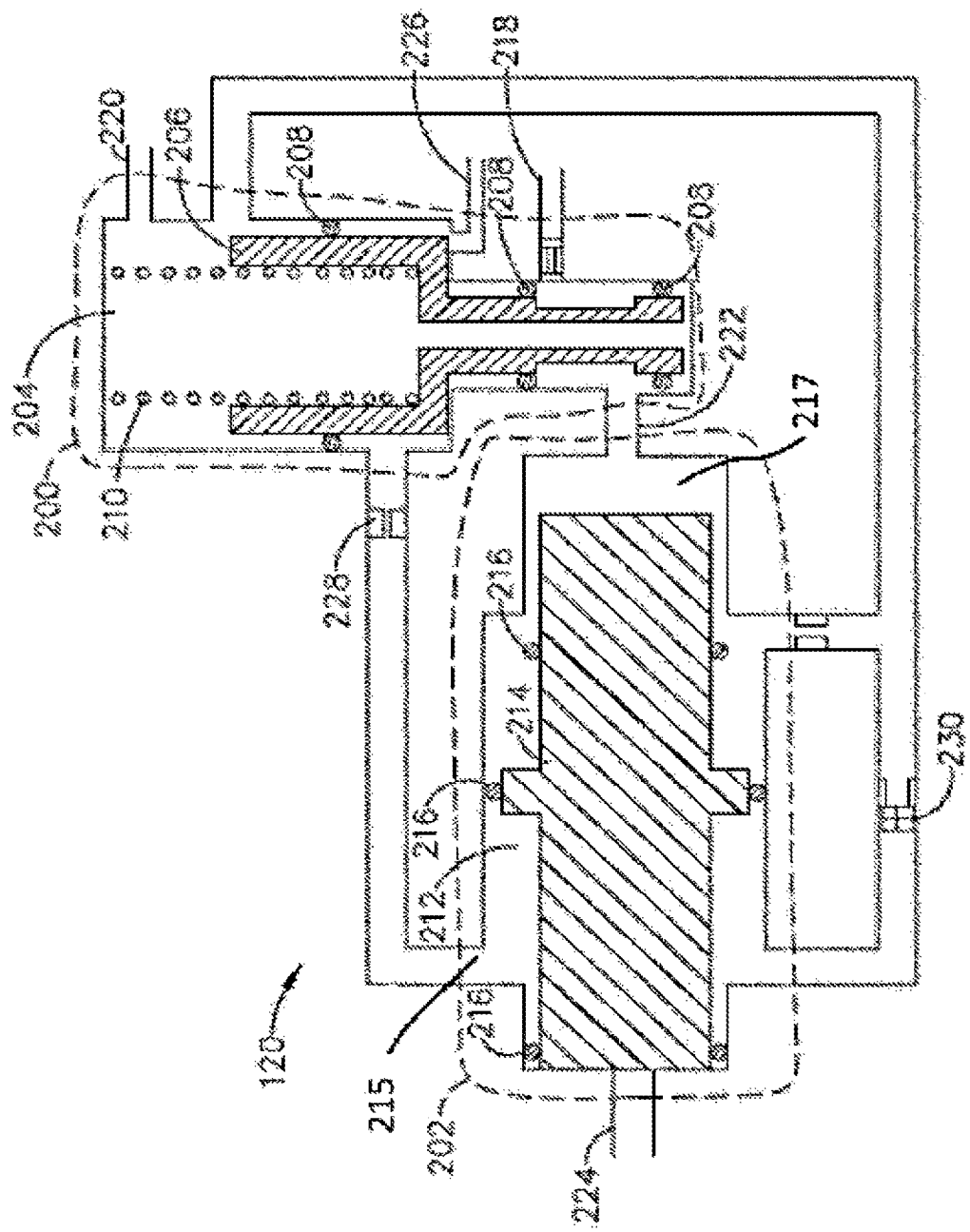
FIG. 3 is a schematic view of the exemplary accumulator system used in the gas turbine engine as shown in FIGS. 1 and 2 at engine startup.

In the exemplary embodiment, during engine operation, the main fuel pump pumps high pressure fuel through high pressure passage 226 to high pressure side 215 of accumulator chamber 212. As a result, there is low pressure in low pressure drain passage 220 and in low pressure side 217 of chamber 212. The high pressure created in high pressure passage 226 and high pressure side 215 forces control valve 206 and accumulator piston 214 to closed positions, as shown in FIG. 2. When the engine slows during shutdown, pressure in high pressure passage 226 and high pressure side 215 become equal to pressure in drain passage 220 and low pressure side 217. Control valve spring 210 forces control valve 206 into the shutdown position as shown in FIG. 3. For the rest of engine shutdown, and while the engine is off, fuel manifold passage 218 is open to accumulator passage 222. In accumulator chamber 212, pressure on high pressure side 215 is equal to pressure on low pressure side, causing accumulator piston 214 to move depending on pressure at accumulator passage 222 relative to ambient pressure in ambient passage 224.

As heat from the engine causes fuel remaining in the fuel manifold lines to heat up and expand, the opening of control valve 206 to fuel manifold passage 218 enables fuel expansion into accumulator system 120. The expanding fuel increases the pressure in accumulator passage 222 working against ambient pressure in ambient passage 224, moving accumulator piston 214 to the open position solely by exerting a force strong enough to overcome the minimal resistance between accumulator piston 214 and o-ring seals 216. Expansion of the fuel into accumulator system 120 prevents pressure build-up in the manifold and thus, leakage of fuel vapors out of the engine. After a period of time, the engine cools down and the fuel contracts, causing a reduction of pressure in accumulator passage 222, which causes accumulator piston 214 to move toward the closed position. The size requirements of accumulator system 120 are designed taking the length and rate of expansion for the particular engine into consideration.

FIG. 3 is a schematic view of accumulator system 120 within a gas turbine engine as shown in FIG. 1 at engine startup, and will be described using the same reference characters as in FIG. 2. In the exemplary embodiment, while the engine is off, accumulator piston 214 remains open and accumulator chamber 212 and accumulator passage 222 contain fuel from the fuel expansion. When the engine begins startup, the high pressure fuel from the main fuel pump rises rapidly in high pressure passage 226 and into high pressure side 215 of accumulator chamber 212. This rapid pressure increase forces control valve 206 to move to the closed position (shown in FIG. 2) and isolates fuel manifold passage 218 pressure from accumulator passage 222 pressure. In accumulator passage 222, the rise in the high pressure at high pressure side 215 forces accumulator piston 214, which is only restricted by the minimal o-ring seal 216 friction, to the closed position (shown in FIG. 2). As accumulator piston 214 closes, it forces the fuel in accumulator chamber 212 and accumulator passage 222 through drain passage 220 and back into the fuel system. The rapid fuel pressure increase is sufficiently large to minimize the amount of fuel that re-enters fuel manifold passage 218 before control valve 206 is completely closed off. This process occurs at very low engine startup speeds before fuel to the engine is even turned on. Thus, accumulator system 120 will have forced substantially all of the fuel that expanded into system 120 back into the fuel system before fuel is even introduced to the engine in the startup process. This enables accumulator system 120 to be completely isolated from the fuel manifold and operate independently from the engine.

Referring to FIGS. 2 and 3, in an alternative embodiment, accumulator system 120 may include a high pressure passage 226 and first and second orifices 228 and 230 for regulating a flow of cooling fluid, i.e. fuel, within accumulator system 120. High pressure from the engine's fuel pump may introduce a small amount of cooling fluid through high pressure passage 226 and into first orifice 228. The cooling fluid may then enter accumulator chamber 212 to cool accumulator piston 214, and then exit through second orifice 230. The cooling fluid may then flow back into control valve chamber 204 and get sent back into the fuel system through drain passage 220.

Figure 4:
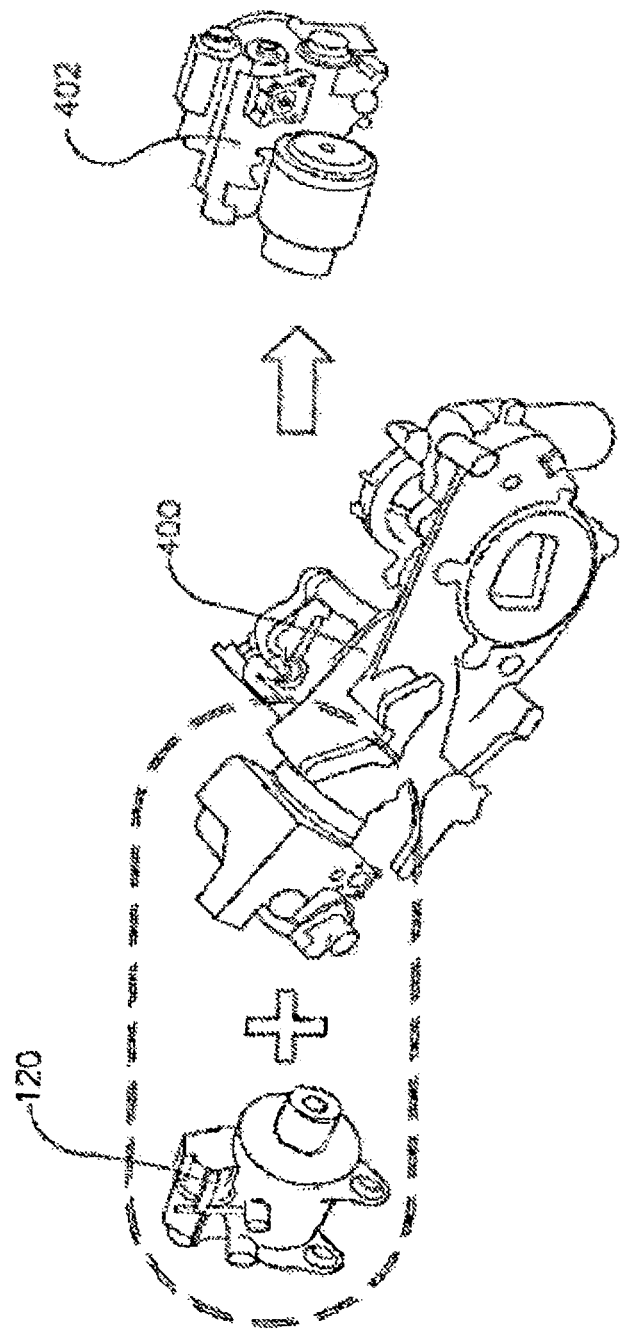
FIG. 4 is a schematic view of the accumulator system shown in FIGS. 1-3 coupled to a fuel split valve of a gas turbine engine to form an FSVA.

FIG. 4 is a schematic view of accumulator system 120 coupled to a fuel split valve of the gas turbine engine. In this embodiment, accumulator system 120 is coupled to a fuel split valve 400 to provide increased simplicity and size efficiency for incorporating accumulator system 120 into an aircraft engine. This combination is referred to as a fuel split valve plus accumulator, or FSVA, 402.

The accumulator system described herein enables fuel and fuel vapors in a gas turbine engine to expand to facilitate preventing fuel vapor leakage from the engine while it is cooling down. The accumulator described herein further enables providing an accumulator that is coupled to existing engine components to facilitate decreasing an overall size and weight of GTE assembly 100 and increasing engine efficiency by reducing fuel consumption of the engine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for a gas turbine engine, comprising:
a control valve within a control valve chamber, the control valve has a first section and a second section extending from the first section, the first section of the control valve having a first diameter and the second section of the control valve having a second diameter that is smaller than the first diameter of the control valve, the control valve chamber has a first section having a first diameter and a second section having a second diameter that is smaller than the first diameter of the control valve chamber, the first section of the control valve being received only within the first section of the control valve chamber and the second section of the control valve being received at least in part in the second section of the control valve chamber;
a high pressure passage coupled to the control valve chamber, wherein the control valve is configured to be in a first valve position in the control valve chamber or a second valve position in the control valve chamber based on a pressure of the high pressure passage, and wherein the high pressure passage is coupled to the first section of the control valve chamber;
a fuel manifold passage coupled to the control valve chamber;
an accumulator piston within an accumulator piston chamber, wherein the accumulator piston defines a first side of the accumulator piston chamber and a second side of the accumulator piston chamber, wherein the first side is coupled to the control valve chamber by a first passage and the second side is coupled to the control valve chamber by a second passage;
an ambient air passage coupled to the accumulator piston chamber;
wherein the accumulator piston is configured to be in a first piston position where pressure from at least one of the high pressure passage and the ambient air passage is greater than pressure from the fuel manifold passage;
wherein the accumulator piston is configured to be in a second piston position where pressure from the fuel manifold passage is greater than pressure from at least one of the high pressure passage and the ambient air passage;
wherein in the first valve position, fuel from the high pressure passage applies a force directly on the first section of the control valve, and wherein the fuel manifold passage is obstructed by the control valve and the high pressure passage is open to the first passage and the first side; and
wherein, in the second valve position, the fuel manifold passage is open to the second passage and the second side.

2. The system of claim 1, wherein the first side and the second side open to a drain passage when the control valve is in the second valve position.

3. The system of claim 1, wherein the pressure in the fuel manifold passage is configured to increase as fuel in the fuel manifold passage heats up and expands.

4. The system of claim 3, wherein the fuel in the fuel manifold passage is configured to expand through the second passage into the second side.

5. The system of claim 4, wherein fuel in the second side is configured to be separated from the fuel manifold passage when fuel moves through the high pressure passage.

6. The system of claim 5, wherein fuel in the second side is directed to a drain passage when fuel moves through the high pressure passage.

7. The system of claim 1, wherein the high pressure passage includes an orifice for regulating flow of fuel.

8. The system of claim 7, wherein the system is configured to provide fuel through the orifice to the first side to cool the accumulator piston.

9. The system of claim 1, comprising a fuel split valve coupled to an accumulator system, the accumulator system including the control valve chamber and the accumulator piston chamber.

10. The system of claim 1, wherein the control valve and the control valve chamber are oriented lengthwise along a first direction and the accumulator piston and the accumulator piston chamber are oriented lengthwise along a direction perpendicular to the first direction.

11. The system of claim 1, wherein, when the control valve is in the first valve position, the first section of the control valve directly engages a housing defining the control valve chamber.

12. The system of claim 1, wherein the second section of the control valve defines a port, and wherein the control valve includes a first seal coupled to the first section of the control valve, a second seal coupled to the second section of the control valve, and a third seal coupled to the second section of the control valve, and wherein the second seal and the third seal are arranged on opposing sides of the port.

13. The system of claim 12, wherein the control valve chamber has a first section having a first diameter and a second section having a second diameter that is smaller than the first diameter, and wherein the second seal and the third seal are positioned at least in part in the second section of the control valve chamber when the control valve is in the first valve position and when in the second valve position.

14. The system of claim 1, wherein the second section of the control valve defines a central passage that extends along an entire lengthwise span of the second section.

15. The system of claim 1, wherein the first section of the control valve obstructs the high pressure passage when the control valve is in the second valve position.

16. The system of claim 1, wherein the accumulator piston includes one or more seals movable therewith.

17. A system for a gas turbine engine, comprising:
a housing defining a control valve chamber, the control valve chamber has a first section having a first diameter and a second section having a second diameter that is smaller than the first diameter;
a control valve movable within the control valve chamber, the control valve has a first section and a second section extending from the first section of the control valve, the first section of the control valve having a first diameter and the second section of the control valve having a second diameter that is less than the first diameter, the first section of the control valve being received only within the first section of the control valve chamber and the second section of the control valve being received at least in part in the second section of the control valve chamber;
a high pressure passage coupled to the first section of the control valve chamber, wherein the control valve is configured to be in a first valve position in the control valve chamber or a second valve position in the control valve chamber based on a pressure of the high pressure passage;

a fuel manifold passage coupled to the control valve chamber;

an accumulator piston within an accumulator piston chamber, wherein the accumulator piston defines a first side of the accumulator piston chamber and a second side of the accumulator piston chamber, wherein the first side is coupled to the control valve chamber by a first passage and the second side is coupled to the control valve chamber by a second passage;

an ambient air passage coupled to the accumulator piston chamber;

wherein the accumulator piston is configured to be in a first piston position where pressure from at least one of the high pressure passage and the ambient air passage is greater than pressure from the fuel manifold passage;

wherein the accumulator piston is configured to be in a second piston position where pressure from the fuel manifold passage is greater than pressure from at least one of the high pressure passage and the ambient air passage;

wherein in the first valve position, fuel from the high pressure passage applies a force directly on the first section of the control valve, and wherein the fuel manifold passage is obstructed by the control valve and the high pressure passage is open to the first passage and the first side;

wherein, in the second valve position, the fuel manifold passage is open to the second passage and the second side; and wherein the high pressure passage, a drain passage, and the first passage are coupled with the first section of the control valve chamber and wherein the fuel manifold passage and the second passage are coupled with the second section of the control valve chamber.

\* \* \* \* \*